United States Patent
Bailey

(10) Patent No.: US 9,409,500 B2
(45) Date of Patent: Aug. 9, 2016

(54) UPPER BODY SUPPORT SYSTEM

(71) Applicant: Marlon Bailey, Miami, FL (US)

(72) Inventor: Marlon Bailey, Miami, FL (US)

( * ) Notice: Subject to any disclaimer, the term of this patent is extended or adjusted under 35 U.S.C. 154(b) by 73 days.

(21) Appl. No.: 14/300,744

(22) Filed: Jun. 10, 2014

(65) Prior Publication Data

US 2015/0352984 A1    Dec. 10, 2015

(51) Int. Cl.
| | |
|---|---|
| *A47C 1/10* | (2006.01) |
| *A47C 7/36* | (2006.01) |
| *A61G 15/00* | (2006.01) |
| *B60R 22/28* | (2006.01) |
| *B60N 2/28* | (2006.01) |
| *A42B 3/04* | (2006.01) |
| *A47C 7/38* | (2006.01) |
| *A47D 15/00* | (2006.01) |

(52) U.S. Cl.
CPC ............ *B60N 2/2812* (2013.01); *A42B 3/0473* (2013.01); *A47C 7/383* (2013.01); *A47D 15/005* (2013.01); *A47D 15/006* (2013.01)

(58) Field of Classification Search
CPC . A47D 15/005; A47D 15/006; B60N 2/2812; B60N 2/286; A47C 7/383
USPC ......... 297/250.1, 256.15, 464, 485, 467, 487, 297/393, 397
See application file for complete search history.

(56) References Cited

U.S. PATENT DOCUMENTS

| | | | | | |
|---|---|---|---|---|---|
| 4,093,307 | A | * | 6/1978 | McLennan | B60R 22/26 297/485 |
| 4,632,425 | A | * | 12/1986 | Barratt | B60R 22/26 280/290 |
| 4,702,523 | A | * | 10/1987 | Schrader | A47D 15/006 297/465 |
| 5,730,498 | A | * | 3/1998 | Hanson | B60R 22/14 2/2.17 |
| 6,082,826 | A | * | 7/2000 | Moreno | A61F 5/3784 297/464 |
| 6,254,184 | B1 | * | 7/2001 | Kontos | B60N 2/286 297/256.15 |
| 6,386,639 | B1 | * | 5/2002 | McMichael | A47D 15/006 297/219.12 |
| 6,449,770 | B1 | * | 9/2002 | Taylor | A41D 13/0007 128/869 |
| 6,607,245 | B1 | * | 8/2003 | Scher | A47C 7/383 297/393 |
| 6,799,802 | B1 | * | 10/2004 | Moran | B60N 2/4879 2/171 |
| 7,628,456 | B1 | * | 12/2009 | Swartz | A47C 7/383 297/393 |
| 7,832,802 | B2 | * | 11/2010 | Ehlers | A47C 7/38 297/393 |
| 8,381,316 | B2 | * | 2/2013 | Edwards | A42B 1/006 2/175.3 |
| 8,820,838 | B1 | * | 9/2014 | Palmer | A47C 7/383 297/393 |
| 8,967,717 | B2 | * | 3/2015 | Sims | A47D 1/008 297/256.15 |
| 9,089,179 | B2 | * | 7/2015 | Tagg | A42B 1/24 |
| 2004/0169411 | A1 | * | 9/2004 | Murray | B60R 25/105 297/486 |
| 2010/0301655 | A1 | * | 12/2010 | Mezger | B60N 2/4879 297/397 |
| 2013/0088063 | A1 | * | 4/2013 | Montes | B60N 2/4882 297/393 |

* cited by examiner

*Primary Examiner* — Chi Q Nguyen
(74) *Attorney, Agent, or Firm* — USAPatents.com; Divya Khullar, Esq.

(57) ABSTRACT

An upper body support system helps stabilize and restrict undesirable movement by an upper body. The system either detachably connects to the mounting surface, or forms an integral unit with the mounting surface. In either case, a stretchable extension between the mounting surface and the upper body is formed with a flexible strap. The strap serves to connect a mount and an upper body garment, such as a hat. The strap has sufficient stretchability to allow for natural movements of the upper body. The mount forms a snug connection to a head support on the mounting surface. The upper body garment includes a garment fastener that detachably joins with a strap garment end. In this manner, the upper body garment can be interchanged for different sizes or indicia. The garment fastener can include a hook and loop fastener. A cover overlays the garment fastener.

17 Claims, 3 Drawing Sheets

UPPER BODY SUPPORT SYSTEM

FIELD OF THE INVENTION

The present invention relates generally to an upper body support system. More so, an upper body support system with detachable components that is configured to be operable to help stabilize a neck and restrict undesirable movement by a head.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The weight of the head hanging forward and sideward, and slouching shoulders, while sleeping in a safety seat, may bend the spine or cause undesirable posture. These undesirable movements can occur while the child is sleeping in a safety seat.

Often, car safety seats do not provide much, if any, support for the child's head or neck. It is mainly used as a safety restraint system. It is also well known that children tend to fall asleep in car seats when the vehicle is moving. When this happens, the child's head typically sag, droop or otherwise hang forward or lay to the side. Prolonged hanging of the head is known to be relatively uncomfortable and can result in a sore neck, pulled muscle, or bad posture. It can also cause a decreased oxygen supply due to the position of the neck.

In many instances, the same problem of slouching and a lack of head and neck support occur in other types of seats configured for children. For example, most strollers and high chairs generally are not configured, and do not have sufficient support to avoid injury or soreness to the child's neck due to slouching.

In many instances, vehicle safety seats perform well with regard to restraining a child in a moving vehicle. The typical safety seat includes a body portion that is secured to a seat in the vehicle and a harness system that secures the child to the safety seat. The body portion has back, bottom and side walls that are dimensioned to receive the child in an upright, outwardly facing position. Harness systems typically comprise a plurality of straps that define a shoulder portion which is placed over the child's shoulders and secured together near the chest and a waist or lower body portion that engages the pelvis area, often between the legs. The straps are joined to the shoulder portion. However, the upper head and neck are often left unrestrained.

In view of the foregoing, it is clear that these traditional techniques are great for restraint, but leave room for more optimal approaches for supporting the head. Once asleep, the body slouches, creating a problem.

SUMMARY OF THE INVENTION

This invention is directed to an upper body support system that is configured to be operable to help stabilize, and restrict undesirable movement by an upper body while sleeping. The system functions in cooperation with a mounting surface to help restrain the upper body into a generally sitting, sloped, or vertical position. In some embodiments, the system may either detachably connect to the mounting surface, or form an integral unit with the mounting surface. In either case, a stretchable connection between the mounting surface and the upper body is formed.

In some embodiments, the upper body may include the head, the neck, the shoulders, the spine, and the upper extremities. The system serves to stabilize and support the upper body in a generally linear or upright orientation in relation to a lower body portion. In this manner, the head, spine, and neck can align with the backbone, and undesirable movements by the upper body may be restricted.

In some embodiments, the system includes a flexible strap that extends between the mounting surface and the upper body. The mounting surface may include, without limitation, a safety seat, a child car seat, a booster seat, and a stroller. The flexible strap is configured to support the upper body, and also extend and retract to enable flexible natural movement by the upper body. In this manner, a slumping head and a slight movement of the head and neck are restricted, yet the natural movements, such as turning, stretching, and lateral movement, are allowed. The flexible strap includes a strap fastening surface for attaching from either end to a mount and an upper body garment.

The flexible strap comprises a strap mount end and a strap garment end. The strap mount end detachably joins with the mount. The strap mount end and the mount may be permanently attached by sewing, or may detachably connect through a mechanism, such as a hook and loop fastener. In one embodiment, the flexible strap and the mount are sewn together to form a permanent attachment. The mount serves chiefly to form a secure base mounting on the safety seat. The mount may at least partially fit over a section of the safety seat that is proximal to the upper body, such as a head support.

Those skilled in the art will recognize that minimizing the distance between the safety seat and the upper body reduces the length of the flexible strap. The reduced length works to help minimize undesired movements by the upper body since the flexible strap has less play. Yet the flexible characteristics of the flexible strap still allow for natural movements by the upper body.

In one embodiment, the mount at least partially encompasses a section of the seat, such as the head support. The mount includes a mount receiving end having an aperture that enables the head support to at least partially pass through for mounting. A mount fastener, such as a tie string, passes through a periphery of the mount receiving end. The fastener extends outwardly to reduce the size of the mount receiving end. The reduced size of the mount receiving end creates a snug fit with the head support. For additional mounting capacity, the ends of the mount fastener pass through the head support and attach to an anchor. In this manner, the mount becomes an integral part of the seat.

In some embodiments, the strap garment end of the flexible strap may detachably join with the upper body garment, such as a hat. The upper body garment may also include a shoulder or neck strap. The upper body garment comprises a garment fastener that detachably joins with the strap fastening surface on the strap garment end. In this manner, the upper body garment is interchangeable. In some embodiments, a cover overlays the garment fastener. The cover may include a patch having the same color and texture as the upper body garment. In one example, the garment fastener comprises a hook and loop fastener that is detachably covered by the cover. Both the garment fastener and the cover may utilize a hook and loop fastener to attach and detach.

In some embodiments, the upper body garment may include an inner surface for engaging the upper body. The inner surface may form a snug fit around the head. The upper body garment may also include an outer surface to provide a surface for displaying a text, images, and colors. Those skilled in the art will recognize that an interchangeable upper body garment enables the display of eclectic text, images, and colors.

A first aspect of the present invention provides an upper body support system for at least partially stabilizing and restricting undesirable movement by an upper body, comprising:

a mount configured to attach to a mounting surface;

an upper body garment configured to be operable to attach to an upper body, the upper body garment comprising an inner surface configured to form a snug fit on the upper body, the upper body garment further comprising an outer surface for displaying a text and/or image and/or color; and a flexible strap arranged to connect the mount to the upper body garment, the flexible strap configured to at least partially restrict an undesirable movement of the upper body and enable a partial lateral movement of the upper body in relation to the mounting surface, the flexible strap comprising a strap fastening surface configured to detachably connect with the upper body garment, the flexible strap further configured to permanently attach to the mount, wherein the upper body garment is configured to detach from the flexible strap for allowing interchanging of the text and/or image and/or color.

In another aspect, the upper body comprises a head.

In another aspect, the mounting surface comprises a safety seat configured to restrain: a 2-3 year old toddler, a 4-5 year old pre-schooler, and a 6-9 year old school age child.

In another aspect, the safety seat comprises a head support and an anchor.

In another aspect, the mount comprises a fabric configured to fits over the head support.

In another aspect, the mount comprises a receiving end configured to at least partially receive the head support.

In another aspect, the mount comprises a mount fastener configured to securely fasten the mount to the mounting surface.

In another aspect, the mount fastener comprises a tie string disposed to circumvent the receiving end.

In another aspect, the upper body garment comprises a baseball cap.

In another aspect, the upper body garment comprises a garment fastener configured to detachably connect to the strap fastening surface.

In another aspect, the garment fastener comprises a hook and loop fastener.

In another aspect, the garment fastener comprises a cover disposed to detachably overlay the garment fastener.

In another aspect, the cover comprises a patch configured to at least partially match the color of the outer surface.

In another aspect, the flexible strap comprises a strap mount end disposed to permanently attach to the mount.

In another aspect, the flexible strap comprises a strap garment end disposed to detachably attach to the garment fastener.

In another aspect, the strap fastening surface at least partially covers the strap garment end.

In another aspect, the strap fastening surface comprises a hook and loop fastener.

In another aspect, the flexible strap comprises a generally Y-shape.

another aspect, the flexible strap comprises a stretchable nylon material.

These and other advantages of the invention will be further understood and appreciated by those skilled in the art by reference to the following written specification, claims and appended drawings.

BRIEF DESCRIPTION OF THE DRAWINGS

The present invention is illustrated by way of example, and not by way of limitation, in the figures of the accompanying drawings and in which like reference numerals refer to similar elements and in which.

Like reference numerals refer to like parts throughout the various views of the drawings.

DETAILED DESCRIPTION OF THE INVENTION

Figure 1:
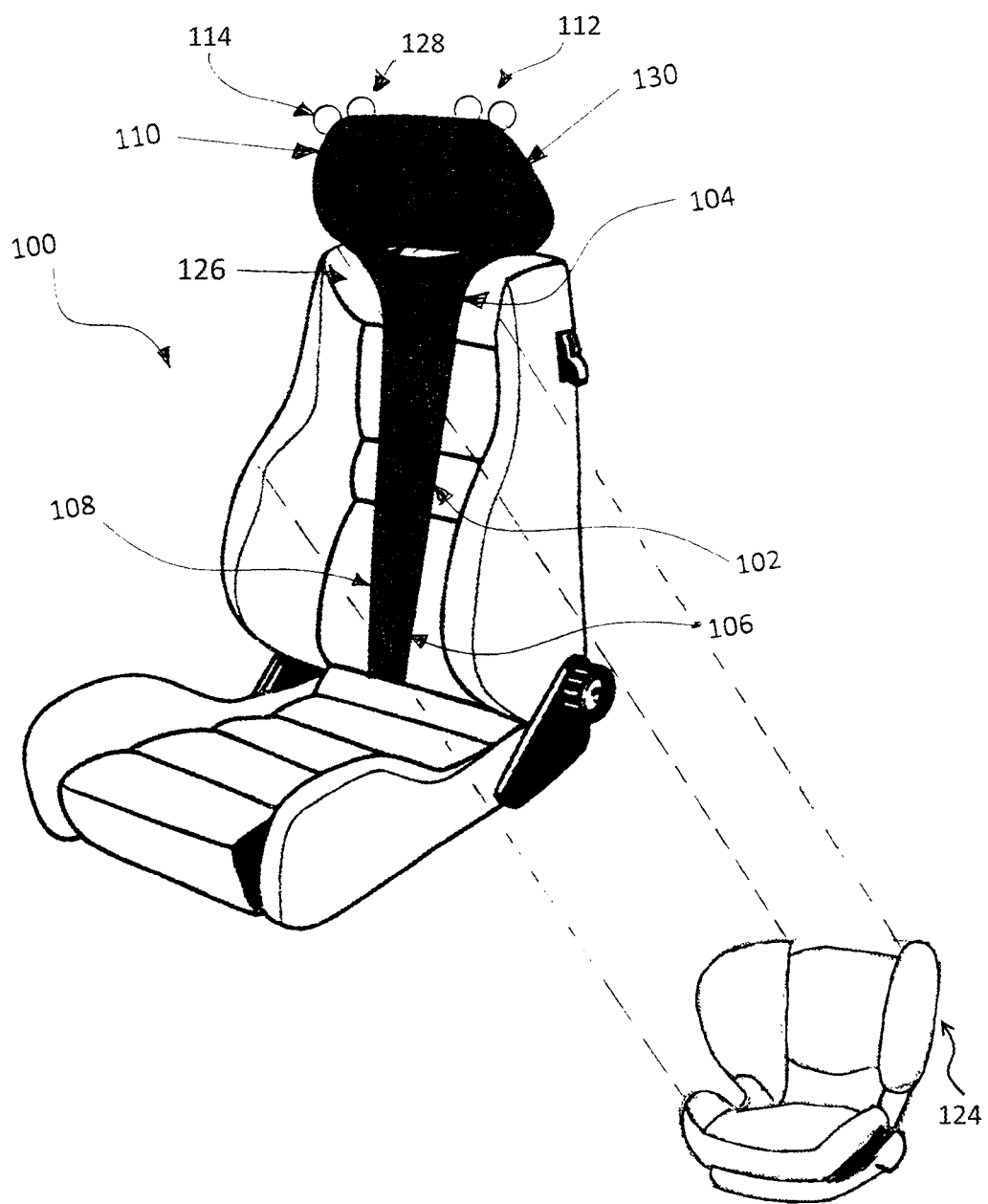
FIG. 1 illustrates a detailed perspective view of an exemplary upper body support system attached to an exemplary mounting surface, in accordance with an embodiment of the present invention.

The present invention is best understood by reference to the detailed figures and description set forth herein.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

FIG. 1 illustrates exemplary upper body support system 100 attached to an exemplary mounting surface 130. The system 100 functions in cooperation with a mounting surface 130 to help restrain an upper body (Not Shown) into a generally sitting, sloped, or vertical position. In one embodiment, the upper body support system 100 is configured to be operable to help stabilize a neck and restrict undesirable movement by a head. However in other embodiments, the system 100 helps support the upper body from a horizontal position, such as a hospital bed. In one alternative embodiment, the system 100 supports the upper body in a zero gravity environment, such as a space environment.

In some embodiments, the system 100 may either detachably connect to the mounting surface 130, or form an integral unit with the mounting surface 130. In either case, a stretchable extension between the mounting surface 130 and the upper body is formed. In some embodiments, the upper body may include the head, the neck, the shoulders, the spine, and the upper extremities. The system 100 serves to stabilize and support the upper body in a generally linear or upright orientation in relation to a lower body portion. In this manner, the head, spine, and neck can align with the backbone, and undesirable movements by the upper body may be restricted. Those skilled in the art will recognize that the system 100 may be efficacious for stabilizing the upper body of a user having a weak upper body or little control over the upper body, such as a baby, a toddler, an elderly person, a handicapped person, a crippled person, a paraplegic, and a person having an impairment in motor or sensory function of the lower extremities. In one embodiment, the system 100 may be designed for children between the ages of 2 and 12 years, who sit in a forward facing safety seat 124 of a vehicle or a stroller according to United States car seat provisions.

In some embodiments, the system 100 includes a flexible strap 102 that extends between the safety seat 124 and the upper body. The safety seat 124 may include, without limitation, a child car seat, a booster seat, a stroller, and any seats configured to more safely and comfortably secure the upper body. The flexible strap 102 is configured to support the upper body, yet also extend and retract to enable flexible lateral movement by the upper body. In this manner, a slumping head and slight movement of the head and neck are restricted. Suitable materials for the flexible strap 102 may include, without limitation, elastic, nylon, polyester, and rubber. The flexible strap 102 includes a strap fastening surface 108 for attaching from either end to a mount 110 and an upper body garment 116.

The flexible strap 102 comprises a strap mount end 104 and a strap garment end 106. The strap mount end 104 detachably joins with a mount 110. The strap mount end 104 and the mount 110 may be permanently attached by sewing, or may detachably connect through a mechanism, such as a hook and loop fastener. In one embodiment, the flexible strap 102 and the mount 110 are sewn together to form a permanent attachment. The mount 110 serves chiefly to form a secure mounting on the safety seat 124. The mount 110 may at least partially fit over a section of the safety seat 124 that is proximal to the upper body, such as a head support 126.

Those skilled in the art will recognize that minimizing the distance between the safety seat 124 and the upper body reduces the length of the flexible strap 102. The reduced length works to help minimize undesired movements by the upper body since the flexible strap 102 has less play. Yet the flexible characteristics of the flexible strap 102 still allow for natural movements by the upper body. In some embodiments, the head support 126 may be disposed as the closest section of the safety seat 124 to the upper body.

In one embodiment, the mount 110 at least partially encompasses a section of the safety seat 124, such as the head support 126. The mount 110 includes a mount receiving end 112 having an aperture that enables the head support 126 to at least partially pass through for mounting. A mount fastener 114, such as a tie string, passes through a periphery of the mount receiving end 112. The mount fastener 114 extends outwardly to reduce the size of the mount receiving end 112. The reduced size of the mount receiving end 112 creates a snug fit with the head support 126. For additional mounting capacity, the ends of the mount fastener 114 pass through the head support 126 and attach to an anchor 128. In this manner, the mount 110 becomes an integral part of the seat. However in other embodiments, the mount 110 may be configured to attach to other types of pertinent mounting surface 130s, including, without limitation, handles on a stroller, a dining table chair supporting a baby high chair, and a special toilet for the handicap or elderly.

Figure 2:
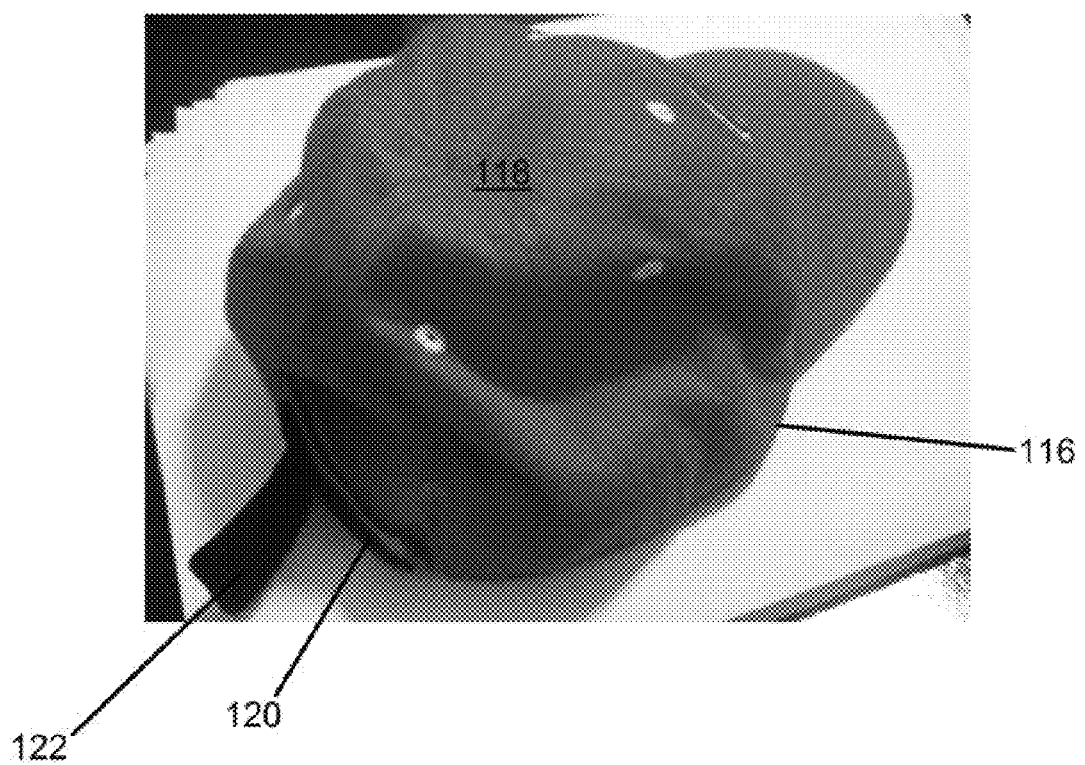
FIG. 2 illustrates a detailed perspective view of an exemplary upper body garment having an exemplary garment fastener and cover, in accordance with an embodiment of the present invention.

Turning now to FIG. 2, the strap garment end 106 of the flexible strap 102 may detachably join with an upper body garment 116, such as a hat. The upper body garment 116 may further include, without limitation, a baseball cap, a helmet, a visor, a top hat, a shoulder strap, a neck strap, and any decorative head gear. The upper body garment 116 comprises a garment fastener 120 that detachably joins with the strap fastening surface 108 on the strap garment end 106. The garment fastener 120 includes a hook and loop fastener configured to mate with the strap fastening surface 108. However in other embodiments, the garment fastener 120 may include, without limitation, a button, a magnet, an adhesive, a string, and a friction connector. The capacity of the upper body garment 116 to easily detach from the flexible strap 102 enables the upper body garment 116 to be interchangeable. Those skilled in the art will recognize that the upper body garment 116 may be interchanged to accommodate different upper body sizes, or different text, images, and colors on various upper body garments 116.

In some embodiments, a cover 122 overlays the garment fastener 120. The cover 122 may include a patch having the same color and texture as the upper body garment 116. In one example, the garment fastener 120 comprises a hook and loop fastener that is detachably covered by the cover 122. Both the garment fastener 120 and the cover 122 may utilize a hook and loop fastener to attach and detach. In some embodiments, the upper body garment 116 may include an inner surface (Not Shown) for engaging the upper body. The inner surface may form a snug fit around the head. The upper body garment 116 may also include an outer surface 118 to provide a surface for displaying decorative text, images, and colors. The interchangeable upper body garment 116 may enable adjustments for different upper body sizes, and display of eclectic text, images, and colors. Examples may include sports team logos, school logos, advertisements, and decorative effects.

Figure 3:
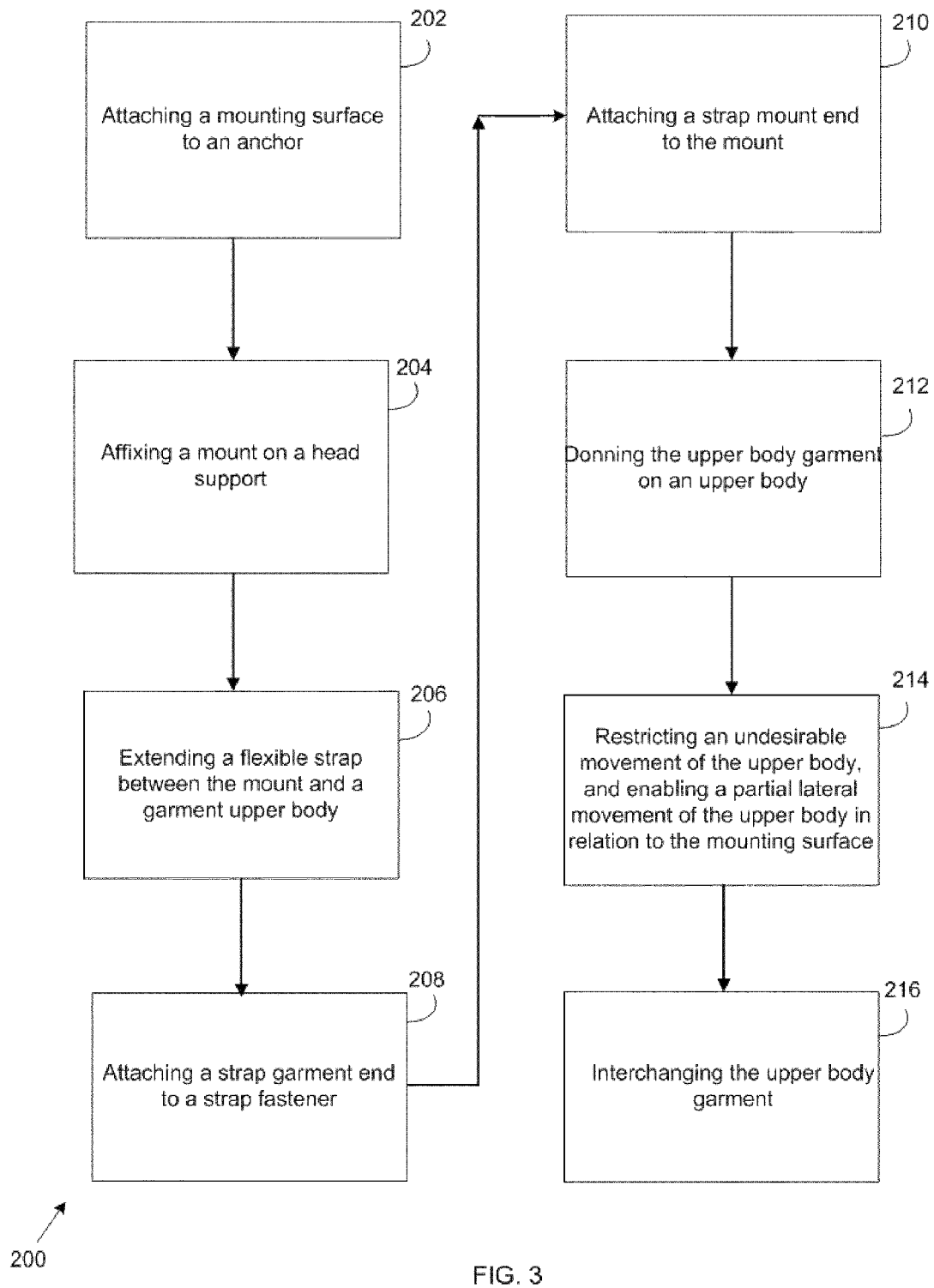
FIG. 3 illustrates a flowchart diagram of an exemplary method for at least partially stabilizing and restricting undesirable movement by an upper body with an upper body support system, in accordance with an embodiment of the present invention.

FIG. 3 illustrates a flowchart diagram of an exemplary method 200 for at least partially stabilizing and restricting undesirable movement by an upper body with an upper body support system 100. The method 200 enables the system 100 to cooperatively work with the mounting surface 130 to help support the upper body into a generally sitting, sloped, or vertical position. In this manner, the system 100 at least partially restricts an undesirable movement of the upper body and enables a partial lateral movement of the upper body in relation to the mounting surface 130. The method may include an initial Step 202 of attaching a mounting surface 130 to an anchor 128. The mounting surface 130 may include a safety seat 124, such as a child car seat. The anchor 128 may include buckles or various holsters on a vehicle seat. However in other embodiments, the anchor 128 may include handles on a stroller, or a dining table chair. In any case, the system 100 attaches firmly to the anchor 128 on the mounting surface 130.

The method 200 may further comprise a Step 204 of affixing the mount 110 on a head support 126. In some embodiments, the mount 110 at least partially encompasses a section of the safety seat 124, such as the head support 126. The mount 110 includes a mount receiving end 112 having an aperture that enables the head support 126 to at least partially pass through for mounting. A mount fastener 114, such as a tie string, passes through a periphery of the mount receiving end 112. The mount fastener 114 extends outwardly to reduce the size of the mount receiving end 112. The reduced size of the mount receiving end 112 creates a snug fit with the head support 126. For additional mounting capacity, the ends of the mount fastener 114 pass through the head support 126 and attach to an anchor 128.

A Step 206 includes extending a flexible strap 102 between the mount 110 and the upper body garment 116. The flexible strap 102 comprises a strap mount end 104 and a strap garment end 106. Suitable materials for the flexible strap 102 may include, without limitation, elastic, nylon, polyester, and rubber. In some embodiments, a Step 208 comprises attaching a strap garment end 106 to a garment fastener 120. The strap garment end 106 of the flexible strap 102 may detachably join with an upper body garment 116, such as a baseball cap. The upper body garment 116 comprises a garment fastener 120 that detachably joins with the strap fastening surface 108 on the strap garment end 106.

A Step 210 includes attaching a strap mount end 104 to the mount 110. The strap mount end 104 detachably joins with a mount 110. The strap mount end 104 and the mount 110 may be permanently attached by sewing, or may detachably connect through a mechanism, such as a hook and loop fastener. In one embodiment, the flexible strap 102 and the mount 110 are sewn together to form a permanent attachment. The mount 110 serves chiefly to form a secure mounting on the safety seat 124. In some embodiments, a Step 212 may include donning the upper body garment 116 on the upper body. The upper body garment 116 includes an inner surface that forms a snug fit with the upper body. The upper body garment 116 may also include an outer surface 118 to provide a surface for displaying decorative text, images, and colors. The interchangeable upper body garment 116 may enable adjustments for different upper body sizes, and display of eclectic text, images, and colors.

A Step 214 comprises limiting an undesirable movement of the upper body, and enabling a partial lateral movement of the upper body in relation to the mounting surface 130. Those skilled in the art will recognize that the upper body support system 100 is configured to be operable to help stabilize a neck and limit undesirable movement by a head. Slouching shoulders while sleeping in a safety seat 124 may bend the spine or cause undesirable posture.

A final Step 216 includes interchanging the upper body garment 116. The upper body garment 116 comprises a garment fastener 120 that detachably joins with the strap fastening surface 108 on the strap garment end 106. The garment fastener 120 comprises a hook and loop fastener configured to mate with the strap fastening surface 108. However in other embodiments, the garment fastener 120 may include, without limitation, a button, a magnet, an adhesive, a string, and a friction connector. The capacity of the upper body garment 116 to easily detach from the flexible strap 102 enables the upper body garment 116 to be interchangeable.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What I claim is:

1. An upper body support system for at least partially stabilizing and restricting undesirable movement by an upper body, the system comprising:

A mount configured to attach to a mounting surface, the mounting surface comprises a safety seat configured to restrain a baby, the safety seat having a head support and an anchor, an upper body garment configured to operably attach an upper body, the upper body garment comprising an inner surface configured to form a snug fit on the upper body, the upper body garment further comprising an outer surface for displaying a at least one of a text or an image or a color; and a flexible strap arranged to connect the mount to the upper body garment, the flexible strap configured to at least partially restrict an undesirable movement of the upper body and enable a partial lateral movement of the upper body in relation to the mounting surface, the flexible strap comprising a strap fastening surface configured to detachably connect with the upper body garment, the flexible strap further configured to permanently attach to the mount, wherein the upper body garment is configured to detach from the flexible strap for allowing interchanging said at least one of the text or the image and the color.

2. The system of claim 1, wherein the mount comprises a fabric configured to fits over the head support.

3. The system of claim 2, wherein the mount comprises a receiving end configured to at least partially receive the head support.

4. The system of claim 3, wherein the mount comprises a mount fastener configured to securely fasten the mount to the mounting surface.

5. The system of claim 4, wherein the mount fastener comprises a tie string disposed to circumvent the receiving end.

6. The system of claim 5, wherein the upper body garment comprises a baseball cap.

7. The system of claim 6, wherein the upper body garment comprises a garment fastener configured to detachably connect to the strap fastening surface.

8. The system of claim 7, wherein the garment fastener comprises a hook and loop fastener.

9. The system of claim 8, wherein the garment fastener comprises a cover disposed to detachably overlay the garment fastener.

10. The system of claim 9, wherein the cover comprises a patch configured to at least partially match the color of the outer surface.

11. The system of claim 10, wherein the flexible strap comprises a strap mount end disposed to permanently attach to the mount.

12. The system of claim 11, wherein the flexible strap comprises a strap garment end disposed to detachably attach to the garment fastener.

13. The system of claim 12, wherein the strap fastening surface at least partially covers the strap garment end.

14. The system of claim 13, wherein the strap fastening surface comprises a hook and loop fastener.

15. The system of claim 14, wherein the flexible strap comprises a generally Y-shape.

16. The system of claim 15, wherein the flexible strap comprises a stretchable nylon material.

17. A method for at least partially stabilizing and restricting undesirable movement by an upper body with an upper body support system, the method comprising:
  attaching a mounting surface to an anchor;
  affixing a mount on a head support;
  extending a flexible strap between the mount and an upper body garment;
  attaching a strap garment end to a garment fastener;
  attaching a strap mount end to the mount;
  donning the upper body garment on an upper body;
  restricting an undesirable movement of the upper body, and enabling a partial lateral movement of the upper body in relation to the mounting surface; and
  interchanging the upper body garment.

* * * * *